Jan. 13, 1953 — T. BJORNSTAD — 2,625,446
SHAFT SEALING DEVICE
Filed Jan. 10, 1951
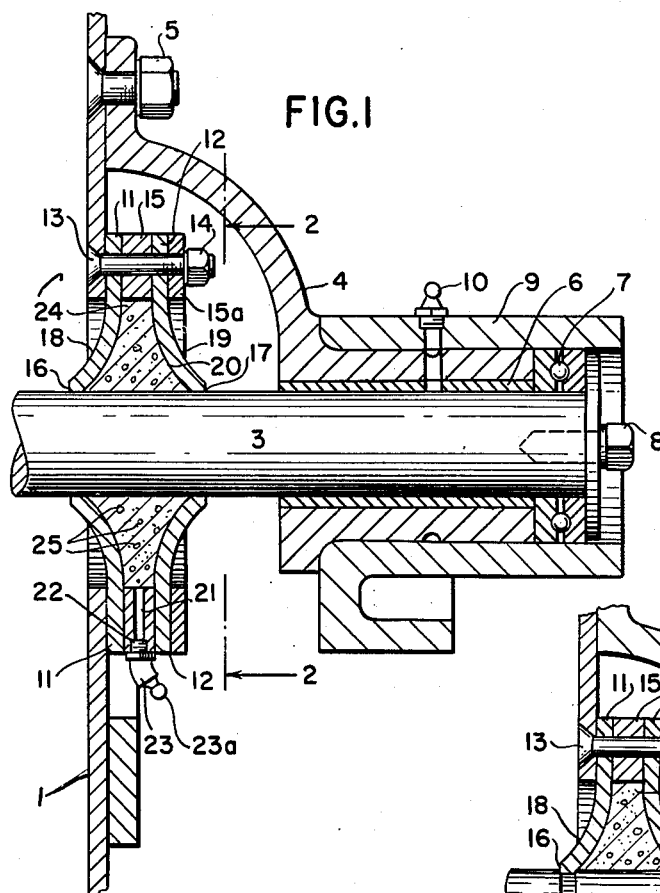
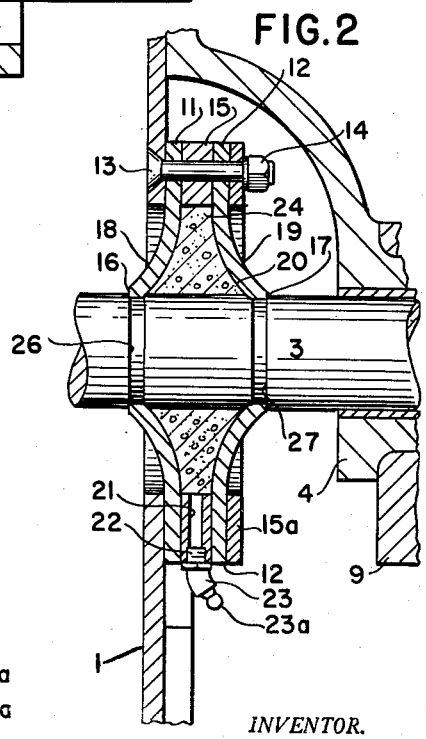
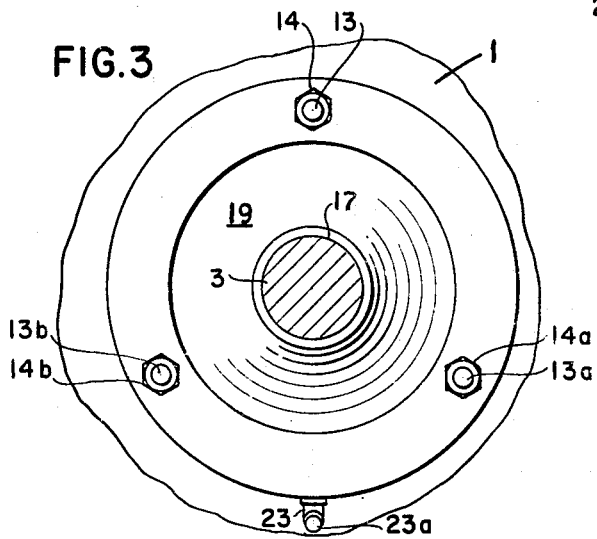
INVENTOR.
Thor Bjornstad
BY
S. G. Cox
ATTORNEY Patented Jan. 13, 1953

2,625,446

UNITED STATES PATENT OFFICE 2,625,446

SHAFT SEALING DEVICE

Thor Bjornstad, Philadelphia, Pa., assignor to Muller Machinery Company, Inc., Metuchen, N. J., a corporation of New Jersey Application January 10, 1951, Serial No. 205,359

6 Claims. (Cl. 308—36.1)

1

This invention relates to shaft sealing means for mortar mixer shafts and the like.

Heretofore it has been common practice in the mixing machine art to provide a stuffing box for the shafts of mortar and plaster mixers in order to prevent the mortar materials from working their way into the bearings of the mixer paddle shafts. These stuffing boxes are very unsatisfactory since after a short time the mortar materials, which include gritty substances work their way into and through the stuffing boxes, harden and cause extreme wear on the shafts they are designed to protect making it necessary to renew the material of the stuffing box quite frequently and making it necessary to tighten up on the stuffing box more frequently. Tightening up on the stuffing box, however, is objectionable since such tightening binds the shaft causing loss of power and furthering the wear on the shaft to such an extent that in a relatively short time a new paddle must be installed. All this has long been well known in the art, but has never before been remedied.

One of the primary objects of this invention is the provision of a paddle shaft bearing protector which rarely needs replacement and which gives positive and absolute protection to the shaft bearings for a long period.

Another object of this invention is the provision of a bearing protector which after long use may be replaced easily, in a minimum of time and at small expense.

Another object of this invention is the provision of a bearing protector which by the very nature of its construction provides a lubricated surface for the paddle shaft.

Another object of this invention is the provision of a bearing protector which absorbs and protectively coats any foreign matter which might happen to enter the protected area.

Other objects and advantages will be apparent from the following specification and in the accompanying drawings, in which—

Fig. 1 is a vertical medial section of the sealing means in position in front of a terminal bearing;

Fig. 2 is a similar section of the sealing means shown in Fig. 1 after a period of use;

Fig. 3 is a plan and a partial cross section taken along the line 2—2 of Fig. 1.

Referring to Fig. 1 of the drawing, 1 is the head of a mixing drum through which is passed a paddle shaft 3. The drum head 1 forms a part of the usual cylindrical mortar mixing drum such as is in common use and the paddle shaft is rotated by suitable power means. Power means, drum and paddles attached to the shaft 3 are no part

2 of this invention, are well known and are therefore mentioned but not shown in the drawings. Shaft 3 is mounted for rotation on a drum trunnion 4 bolted to the drum head 1 at 5 and is supported by the usual bushings 6, ball thrust bearings 7, centering pin bearing 8 and housing cap 9, the parts 6, 7, 8 and 9 being lubricated through the lubrication valve 10. None of the parts 4 through 10 are essential parts of this invention and are mentioned for continuity only.

Surrounding the shaft 3 at point of entry through the drum head are annular disks 11 and 12 which are attached to the drum end 1 by the bolts 13, 13a and 13b and secured by the threaded nuts 14, 14a and 14b. The disks 11 and 12 are separated from each other by the metal ring spacer 15, and next to the disk 12 is a pressure or clamping ring 15a for the purpose of imposing even pressure on the disk 11 and 12 and spacer ring 15 throughout their entire circumference. The disks 11 and 12 are preferably composed of a polymer of chloroprene which has been found especially suited for the purpose, since it is a synthetic elastic composition and therefore a relatively resilient material unaffected by most organic substances, such as grease oil and hydrocarbon fluids. Although I have found a substance, whose trade-mark name is neoprene, ideally suited for the purpose, I do not wish to limit myself to this specific lastic, as other substances providing they are grease and oil resistant may be found equally effective and may be used without departing from the scope of my invention. The disks 11 and 12 have cut into their center, orifices 16 and 17 of slightly smaller diameter than the diameter of the shaft 3, and the disks are fastened into position on the drum head by bolts 13, 13a and 13b and by nuts 14, 14a and 14b in such a manner that the distance between the outside diameter of the shaft and the bolts 13, 13a and 13b is less than the distance from the edges of the orifices 16 and 17 to the outside perimeter of the disks 11 and 12, so that when placed over the shaft and bolted into position the disks are bent or flared outwardly at 18 and 19 to form the bell shaped chamber 20 as seen in cross section in Figs. 1 and 2.

The spacer ring 15 has cut into it at some convenient point a peripheral bore 21 with an apertured cap threaded at 22 to accommodate a one way lubrication cup 23 forming part of the cap and closed by a cap 23a, for the purpose of admitting under pressure a lubricant 24 whose composition is such that it is water resistant, preferably water resistant grease.

In operation the bell shaped portion 20 between the disk 11 and 12 is filled to capacity with water resistant lubricant grease through the cup 23. When the mixer is in operation the shaft 3 revolves and the mixer paddles agitate and mix the material in the interior of the drum. Much of the material, however, is thrown against the shaft and attempts to work itself toward the bearings housed in the drum trunnion 4, but this is effectively blocked by the disk 11 whose inner edge 16 bears on the shaft 3. However, should any gritty or other deleterious material (designated 25 in Figs. 1 and 2) escape past the disk 11 and attempt to go further along the shaft, it is caught up by the water resistant grease lubricant 24 and held in the bell-like chamber 20 by the disk 12 so that it can do no harm.

It has heretofore been found that after a short period of time the disks 11 and 12 at their point of contact 16 and 17 with the shaft 3 form slight annular grooves or indentations 26 and 27 in the shaft 3 and these indentations further the sealing action of the disks and allow them to perform their functions more efficiently. It may be preferred, however, to form these grooves partially before the parts are assembled. During all the period of rotation of the shaft 3 it should be remembered that the grease 24 in addition to its function of acting as a foreign particle trap is also effectively lubricating the shaft 3 and reducing thereby any drag which could cause a power loss.

If it is found necessary the grooves 26 and 27 can be precut to normal depth on the shaft 3 as shown in Fig. 2 to form initially a more efficient seal.

When the disks 11 and 12 or either of them becomes worn, they may be easily replaced by removing nuts 14, 14a and 14b and the parts 11, 15, 12 and 15a, substituting new disks 11 and 12 and reassembling in the order named above. That this may be done quickly and easily is self-evident and additional grease may also be forced into the bell-like chamber 20 as needed by a grease pump or the like.

I claim:

1. In a shaft sealing device of the character described, a drum head, a shaft mounted on bearings for rotation independent of said drum head, substantially resilient disks mounted in spaced apart relation on said drum head and under pressure contact with said shaft, the space between said disks and along said shaft being filled with semi-solid lubricating material.

2. In a shaft sealing device of the character described, a drum head, a shaft mounted on bearings for rotation independent of said drum head, substantially resilient disks mounted in spaced apart relation on said drum head and under pressure and resilient contact with said shaft, the space between said disks and along said shaft being filled with semisolid lubricating material.

3. In a shaft sealing device of the character described, a drum head, a shaft mounted on bearings for rotation independent of said drum head, substantially resilient disks mounted in spaced apart relation on said drum head and under edgewise pressure contact with said shaft, the space between said disks and along said shaft being filled with semisolid lubricating material, a valve associated with said shaft sealing device whereby said lubricating material may be renewed.

4. In a shaft sealing device of the character described, a drum head, a shaft mounted on bearings for rotation independent of said drum head, substantially resilient disks fixedly mounted in spaced apart relation on said drum head and under pressure contact with said shaft, the space between said disks and along said shafts being filled with semisolid lubricating greaselike material.

5. In a shaft sealing device of the character described, a drum head, a shaft mounted on bearings for rotation independent of said drum head, substantially resilient disks mounted in spaced apart relation on said drum head and under pressure contact with said shaft, the space between said disks and along said shaft being filled with semisolid lubricating material and the resiliency of the pressured disks constantly tending to press said filling material against said shaft.

6. In a shaft sealing device of the character described, a drum head, a shaft mounted on bearings for rotation independent of said drum head, substantially resilient disks mounted in spaced apart relation on said drum head and under pressure contact with said shaft, the space between said disks and along said shaft being filled with semisolid lubricating material, said shaft having shallow annular grooves receiving the edges of said disks.

THOR BJORNSTAD.

REFERENCES CITED

The following references are of record in the file of this patent:

UNITED STATES PATENTS

| Number | Name | Date |
|---|---|---|
| 1,407,186 | Brown | Feb. 21, 1922 |
| 1,744,294 | Adams | Jan. 21, 1930 |
| 1,788,414 | Stevenson | Jan. 13, 1931 |
| 2,264,413 | Siegerist | Dec. 2, 1941 |
| 2,568,056 | Corder | Sept. 18, 1951 |